US006968560B2

(12) United States Patent  (10) Patent No.: US 6,968,560 B2
Inoue et al.  (45) Date of Patent: Nov. 22, 2005

(54) OPTICAL DISC DRIVING APPARATUS

(75) Inventors: Takashi Inoue, Kanagawa-ken (JP); Hiroki Kobayashi, Kanagawa-ken (JP); Yutaka Hino, Kanagawa-ken (JP); Junya Takahashi, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 134 days.

(21) Appl. No.: 10/653,662

(22) Filed: Sep. 2, 2003

(65) Prior Publication Data

US 2004/0042372 A1  Mar. 4, 2004

(30) Foreign Application Priority Data

Sep. 3, 2002 (JP) .............................. 2002-258004

(51) Int. Cl.⁷ ............................................. G11B 17/04
(52) U.S. Cl. ..................................................... 720/625
(58) Field of Search .............................. 720/625, 624, 720/619, 617, 600; 369/30.6, 30.48, 30.9

(56) References Cited

U.S. PATENT DOCUMENTS 5,022,023 A * 6/1991 Toyoguchi .................. 720/624
6,033,522 A * 3/2000 Iwata et al. ............. 156/345.12

FOREIGN PATENT DOCUMENTS

JP          01-091361 A    *  4/1989

* cited by examiner

*Primary Examiner*—Julie Anne Watko
(74) *Attorney, Agent, or Firm*—Pearne & Gordon LLP

(57) ABSTRACT

Herein disclosed is an optical disc driving apparatus adapted to selectively drive two kinds of optical discs different in diameter from each other to reproduce information recorded in the optical disc while reading out information in the optical disc. The optical disc driving apparatus comprises: a housing formed with a loading slot having the optical disc pass therethrough; a turntable for retaining the optical disc and, the turntable being supported by the housing and having a center axis, the turntable being driven to rotate around the center axis with the optical disc and being retained by the turntable to reproduce information recorded in the optical disc while reading out information in the optical disc; a guide plate positioned within the housing in the vicinity of the loading slot and supported by the housing, the guide plate having an inner surface contactable with the optical disc to guide the optical disc toward the turntable until the optical disc is retained by the turntable after being partly passed through the loading slot; a rotation shaft having a center axis and supported by the housing with the center axis being in parallel relationship with the inner surface of the guide plate and with the inner surface of the guide plate extending toward the turntable, the rotation shaft having three different longitudinal portions including first and second side portions axially spaced apart from each other, and a spacer portion intervening between the first and second side portions, the first and second side portions being tapered toward the spacer portion; and driving means for driving the rotation shaft to have the rotation shaft rotate around the center axis to ensure that the optical disc is conveyed toward the turntable by the rotation shaft while the optical disc is being guided by the guide plate.

14 Claims, 20 Drawing Sheets

OPTICAL DISC DRIVING APPARATUS

BACKGROUND OF THE INVENTION

1. Technical Field of the Invention

The present invention relates to an optical disc driving apparatus, and more particularly to an optical disc driving apparatus to be installed in an automotive vehicle to drive an optical disc such as for example a compact disc and a digital versatile disc while reading out information contained in the optical disc.

2. Description of the Related Art

Up until now, there have been provided a wide variety of optical disc driving apparatuses each of which can drive a plurality of optical discs including a digital versatile disc and a compact disc to reproduce information from data recorded in the optical discs. One of the conventional optical disc driving apparatuses is disclosed in, for example, Japanese Patent Laying-Open Publication No. 2001-344861 and shown in FIGS. 15 to 20. The conventional optical disc driving apparatus 300 is herein shown as comprising a housing 310, and a turntable 322 provided at the center of the housing 310. The housing 310 has a front plate and a rear plate, the front plate being formed with a loading slot 311 having two kinds of optical discs different in size, for example, 8-centimeter diameter and 12-centimeter diameter pass therethrough. Herein shown in FIGS. 16 to 20 is an optical disc 390 of 8-centimeter diameter which will be described hereinafter.

The turntable 322 is rotatably supported by the housing 310 to retain and rotate the optical disc 390. The turntable 322 has a center axis around which the turntable 322 is rotated, and the housing 310 has a center plane passing though the center axis of the turntable 322. The conventional optical disc driving apparatus 300 further comprises a guide plate 340 which is positioned within the housing 310 in the vicinity of the loading slot 311 and supported by the housing 310. The guide plate 340 has an inner surface 341 contactable with the optical disc 390 to guide the optical disc 390 toward the turntable 322 until the optical disc 390 is retained by the turntable 322 after being partly passed through the loading slot 311.

The conventional optical disc driving apparatus 300 further comprises a rotation shaft 352 having a center axis perpendicular to the center plane of the housing 310, and supported by the housing 310 with the center axis being in parallel relationship with the inner surface 341 of the guide plate 340 along the center plane of the housing 310, viz., when seen from the front plate of the housing 310. The rotation shaft 352 has an intermediate plane on the center plane of the housing 310, and two different longitudinal portions including first and second side portions 353 and 354 integrally formed with each other at the intermediate plane and tapered toward the intermediate plane. The left and right positioning pins 370a and 370b are adapted to position the optical disc 390 while the optical disc 390 is loaded on the turntable 322. The left and right positioning pins 370a and 370b are fixedly mounted on the housing 310 in the vicinity of the rear plate of the housing 310 and in spaced relationship with each other across the center plane of the housing 310. The conventional optical disc driving apparatus 300 further comprises driving means for driving said rotation shaft 352. The following description is directed to the operation of the conventional optical disc driving apparatus 300 in which the optical disc 390 of the 8-centimeter diameter is driven to rotate by the turntable 322.

Firstly, the optical disc 390 is loaded through the loading slot 311 formed in the housing 310. The lateral length of the loading slot 311 is larger than the diameter of the optical disc 390. It is, here, assumed that the optical disc 390 is inserted through the left end portion 311a of the loading slot 311 by an operator as seen in FIG. 17. At this time, the left peripheral surface of the optical disc 390 is positioned in neighborhood of the left end portion 311a of the loading slot 311, while the left lower peripheral surface is brought into contact with the first side portion 353 of the rotation shaft 352. Under these conditions, the optical disc 390 is subject to a driving force compounded by first and second directional forces in the directions shown respectively by arrows 301 and 303 both of which are caused by the rotation of the rotation shaft 352 under the influence of the friction force generated in a contact area between the optical disc 390 and the first side portion 353 of the rotation shaft 352. This results in the fact that the optical disc 390 is rotated in a rotation direction shown by an arrow 302 in FIG. 19 and conveyed in the direction 303 by the first and second directional forces respectively in the directions 301 and 303. The first directional force of the driving force in the direction 301 is caused by the rotation of the rotation shaft 352, while the second directional force of the driving force in the direction 303 is caused by the tapered first side portion of the rotation shaft 352. Here, the contact area is shown in FIG. 18 by a block of crossed lines as at 330. The optical disc 390 is then conveyed toward the turntable 322 until the outer peripheral surface of the optical disc 390 is brought into engagement with the left positioning pin 370a in FIG. 19. When the outer peripheral surface of the optical disc 390 is brought into engagement with the left positioning pin 370a, the right lower peripheral surface of the optical disc 390 is in turn brought into contact with the second side portion 354 of the rotation shaft 352. At this time, the optical disc 390 is subject to a driving force compounded by first and second directional forces in the directions 301 and 303 and a third directional force in a direction opposite to the direction 303. The first directional force in the direction 301 caused by the rotated first side portion 353 is larger than the first directional force in the direction 301 caused by the rotated second side portion 354, while the second directional force in the direction 303 caused by the rotated first side portion 353 is also larger than the third directional force in the direction opposite to the direction 303 caused by the rotated second side portion 354. This means that the second directional force in the direction 303 caused by the rotated first side portion 353 is reduced by the third directional force in the direction opposite to the direction 303 caused by the rotated second side portion 354. The rotation force in the rotation direction 302 is reduced by the first directional force in the direction 301 caused by the rotated second side portion 354.

The optical disc driving apparatus 300 thus constructed as previously mentioned, however, encounters such a problem that the optical disc 390 frequently fails to be retained by the turntable 322 without being in axial alignment with the turntable 322. Additionally, the optical disc driving apparatus 300 tends to need a relatively long time for the optical disc 390 to be retained by the turntable 322.

SUMMARY OF THE INVENTION

It is, therefore, an object of the present invention to provide an optical disc driving apparatus which can retain an optical disc on a turntable 322 with certainty.

It is another object of the present invention to provide an optical disc driving apparatus which can retain an optical disc within a relatively short period of time.

According to the first aspect of the present invention, there is provided an optical disc driving apparatus for selectively driving two kinds of optical discs different in diameter from each other to reproduce information recorded in the optical disc while reading out information in the optical disc, comprising: a housing formed with a loading slot having the optical disc pass therethrough; a turntable for retaining the optical disc, the turntable being supported by the housing and having a center axis, the turntable being driven to rotate around the center axis with the optical disc and being retained by the turntable to reproduce information recorded in the optical disc while reading out information in the optical disc; a guide plate positioned within the housing in the vicinity of the loading slot and supported by the housing, the guide plate having an inner surface contactable with the optical disc and to guide the optical disc toward the turntable until the optical disc and is retained by the turntable after being partly passed through the loading slot; a rotation shaft having a center axis and supported by the housing with the center axis being in parallel relationship with the inner surface of the guide plate and with the inner surface of the guide plate extending toward the turntable, the rotation shaft having three different longitudinal portions including first and second side portions axially spaced apart from each other, and a spacer portion intervening between the first and second side portions, the first and second side portions and being tapered toward the spacer portion; and driving means for driving the rotation shaft to have the rotation shaft rotate around the center axis to ensure that the optical disc is conveyed toward the turntable by the rotation shaft while the optical disc is being guided by the guide plate.

The spacer portion may have a cross-section taken on a plane perpendicular to the center axis of the rotation shaft, and the first and second side portions each has a cross-section taken on a plane perpendicular to the center axis of the rotation shaft. The cross-section of the spacer portion may be smaller in diameter than the cross-section of each of the first and second side portions. The spacer portion may be integrally formed with the first and second side portions.

The first and second side portions may have respective shapes identical to each other. The spacer portion may have a pair of side sections axially spaced apart from each other, and a central section intervening the side sections, the side sections of the spacer portion each being tapered toward the central section. The central section may be integrally formed with the side sections. The side sections of the spacer portion may have respective shapes identical to each other.

BRIEF DESCRIPTION OF THE DRAWINGS

The features and advantages of an optical disc driving apparatus according to the present invention will be more clearly understood from the following description taken in conjunction with the accompanying drawings in which.

DESCRIPTION OF THE EMBODIMENTS

The following description will hereinafter be directed to the first preferred embodiment of the optical disc driving apparatus according to the present invention with reference to FIGS. 1 to 13.

Figure 1:
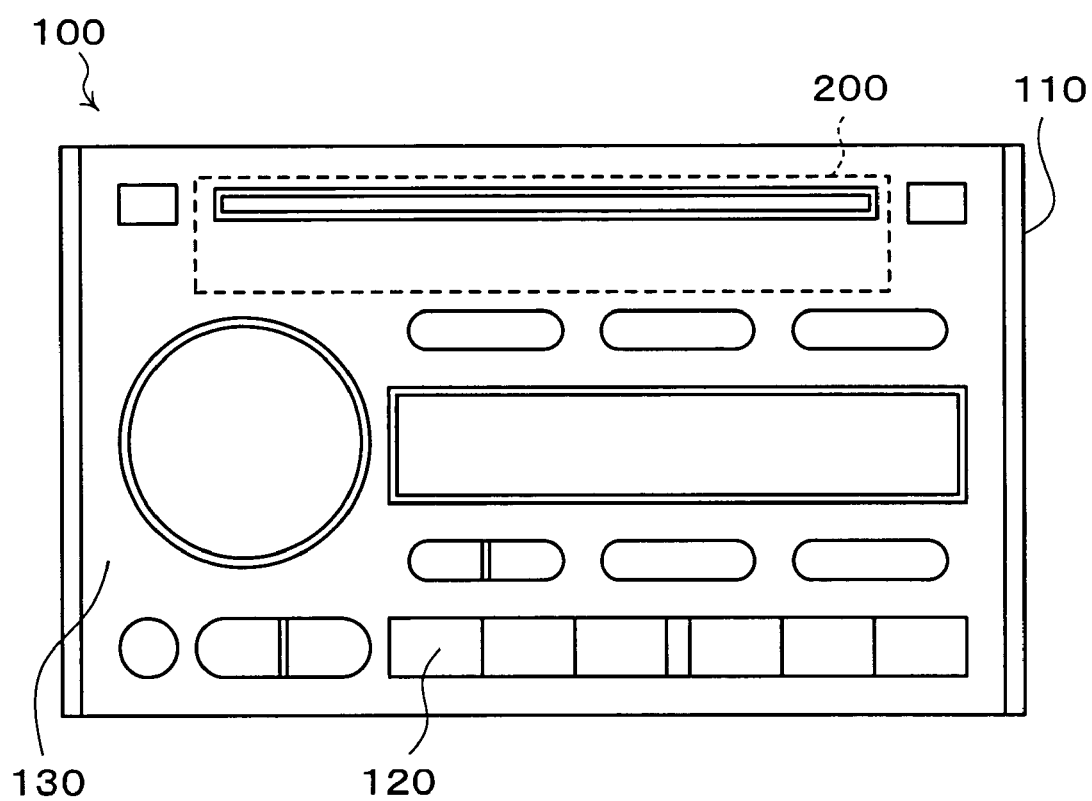
FIG. 1 is a front view of an electric device assembled with a first preferred embodiment of an optical disc driving apparatus according to the present invention.
Figure 2:
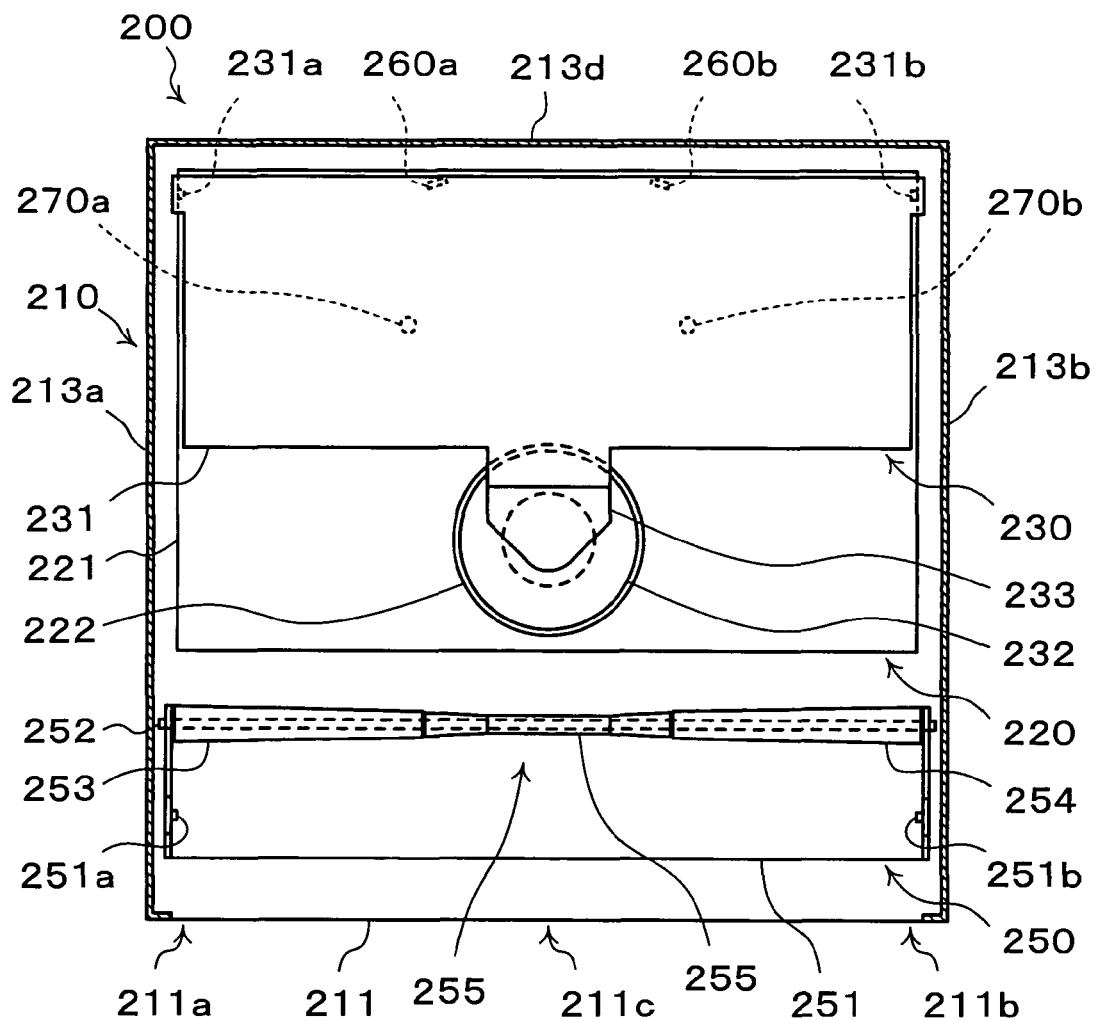
FIG. 2 is a plan view of the first preferred embodiment of the optical disc driving apparatus according to the present invention with a guide plate and an upper plate omitted but showing a rotation shaft, positioning pins, and a turntable provided in a housing forming of the optical disc driving apparatus.
Figure 3:
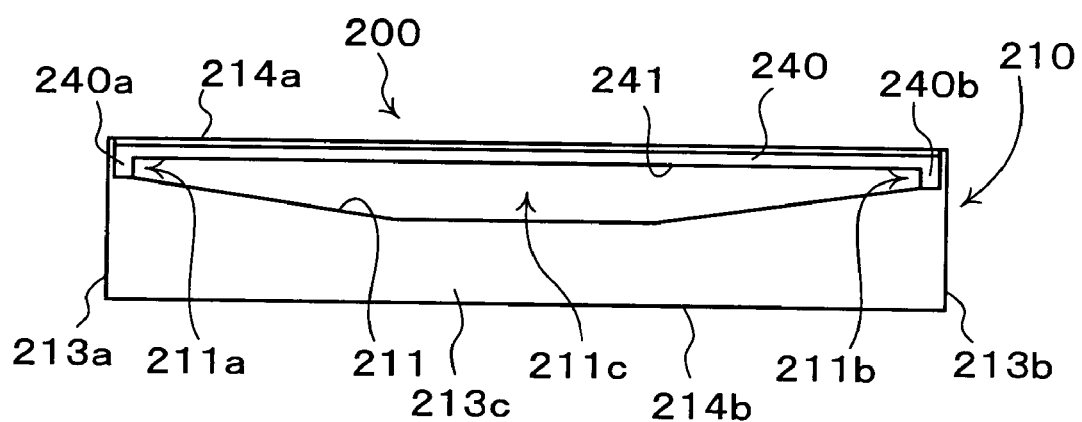
FIG. 3 is a front view of the optical disc driving apparatus and showing a front plate formed with a loading slot.

In FIG. 1, there is an electric device 100 which comprises a casing 110 into which is incorporated an optical disc driving apparatus 200 for driving optical discs such as for example a compact disc and a digital versatile to reproduce information recorded in the optical disc while reading out information in the optical disc, a cassette tape apparatus for driving a cassette tape to record information into the cassette tape and to reproduce information recorded in the cassette tape, and a radio apparatus for receiving electric waves from a signal transmitting station to demodulate sound signals from the electric waves. The electric device 100 is provided with an operation panel 130 having thereon a plurality of operation buttons 120 for operating the optical disc driving apparatus 200, the cassette tape apparatus, and the radio apparatus.

The optical disc driving apparatus 200 is shown in FIGS. 2 to 13 to selectively drive two kinds of optical discs 280 and 290 different in size, for example, 8-centimeter diameter and 12-centimeter diameter, to reproduce information recorded in the optical discs 280 and 290 while reading out information in the optical discs 280 and 290. The optical disc driving apparatus 200 comprises a housing 210, a floating unit 220 for rotatably supporting a turntable 222, a clamp unit 230 for clamping each of the optical discs 280 and 290 when each of the optical discs 280 and 290 is retained and rotated by the turntable 222, a guide plate 240 for guiding each of the optical discs 280 and 290, a feed unit 250 for conveying each of the optical discs 280 and 290 toward the turntable 222, and driving means 257 for driving a rotation shaft. Here, the above housing 210, the turntable 222 and the rotation shaft 256 will become apparent as the description proceeds.

The housing 210 is assembled in the casing 110 of the electric device 100, and includes an upper plate 214a, a lower plate 214b, a pair of side plates 213a and 213b, a front plate 213c, and a rear plate 213d. The front plate 213c of the housing 210 is formed with a loading slot 211 having each of the optical discs 280 and 290 pass therethrough.

The floating unit 220 comprises a suspension chasse 221 supported on the lower plate 214b through a resilient member (not shown) such as a coil spring, and a dumper not shown in the drawing, a turntable 222 having a center axis and rotatably supported on the suspension chasse 221 to retain each of the optical discs 280 and 290 when each of the optical discs 280 and 290 is driven to rotate, an electric motor (not shown) fixedly mounted on the suspension chasse 221 to drive the turntable 222, and optical information reading means (not shown) fixedly supported on the suspension chasse 221 in the vicinity of the turntable 222 to read out information recorded in each of the optical discs 280 and 290. It will be understood from the above description that the turntable 222 is driven to rotate around the center axis with each of the optical discs 280 and 290 being retained by the turntable 222 to reproduce information recorded in each of the optical discs 280 and 290 while reading out information in each of the optical discs 280 and 290 as set forth in claims.

The clamp unit 230 comprises a clamp plate 231 pivotally mounted on the floating unit 220 by pivotal pins 231a and 231b to be movable into and out of a clamping position where each of the optical discs 280 and 290 is clamped by the clamp plate 231 and the suspension chasse 221, a disc clamp 232 resiliently supported on the clamp plate 231 by a resilient member 233 in opposing relationship with the turntable 222 and rotatable with respect to the clamp plate 231 to retain each of the optical discs 280 and 290 in cooperation with the turntable 222 when each of the optical discs 280 and 290 and the disc clamp 231 are rotated by the turntable 222.

The clamp unit 230 further comprises a plurality of first positioning pins 270a and 270b fixedly mounted on the clamp plate 231 at their respective positions rear of the turntable 222 and in spaced relationship with one another to position the optical disc 290 of 8-centimeter diameter at its operation position in which the center axis of the optical disc 290 of 8-centimeter diameter is axially aligned with the central axis of the turntable 222 with the outer peripheral surface of the optical disc 290 being brought into engagement with the first positioning pins 270a and 270b to have the optical disc 290 stopped by the first positioning pins 270a and 270b.

The clamp unit 230 further comprises a plurality of second positioning pins 260a and 260b fixedly mounted on the clamp plate 231 at their respective positions rear of the turntable 222 and in spaced relationship with one another to position the optical disc 280 of 12-centimeter diameter at its operation position in which the center axis of the optical disc 280 of 12-centimeter diameter is axially aligned with the central axis of the turntable 222 with the outer peripheral surface of the optical disc 280 being brought into engagement with the second positioning pins 260a and 260b to have the optical disc 280 stopped by the second positioning pins 260a and 260b.

The clamp unit 230 further comprises detection means (not shown) for detecting the optical disc 280 of the 12-centimeter diameter to retract the first positioning pins 270a and 270b of the optical disc 290 of the 8-centimeter diameter out of the operation position to ensure the optical disc 280 of the 12-centimeter diameter to be moved to and retained by the turntable 222.

The guide plate 240 is positioned within the housing 210 and fixedly supported by the upper plate 214a of the housing 210 in the vicinity of and along the loading slot 211. The guide plate 240 has an inner surface 241 contactable with each of the optical discs 280 and 290 to guide each of the optical discs 280 and 290 toward the turntable 222 until each of the optical discs 280 and 290 is retained by the turntable 222 after being partly passed through the loading slot 211. The guide plate 240 has a pair of regulating members 240a and 240b positioned in the right and left side end portions 211a and 211b of the loading slot 211 to regulate the movement of each of the optical discs 280 and 290 when each of the optical discs 280 and 290 is passed through the loading slot 211. The guide plate 240 is made of a lubricative material including a synthetic resin such as for example polyacetal (POM), polyamide (PA) and polytetrafluoroethylene (PTFE).

Figure 4:
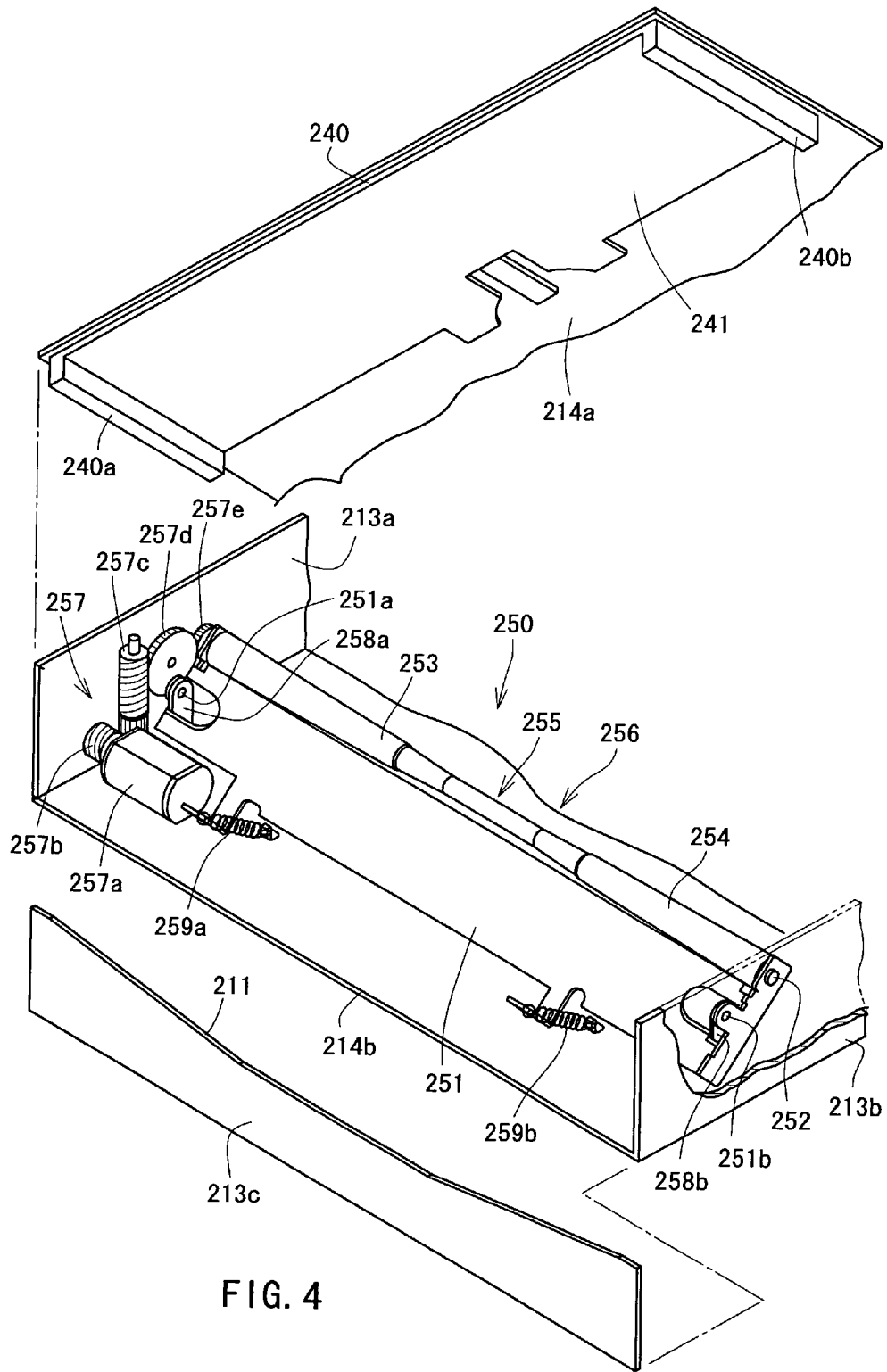
FIG. 4 is a perspective view partly cut-off of the housing and showing the rotation shaft, the guide plate, the driving means for driving the rotation shaft, and the front plate disassembled from the housing with the upper plate being disassembled from the side plates, and the lower plate and with the front plate being opened from the side plates, and the lower plate.
Figure 5:
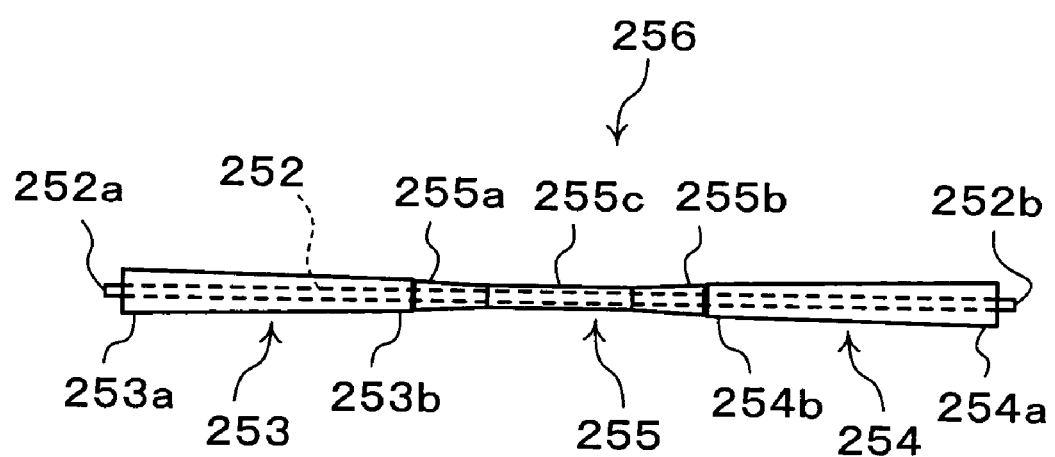
FIG. 5 is a side view of the rotation shaft to be assembled in the optical disc driving apparatus according to the present invention.

The feed unit 250 comprises a pair of bracket members 258a and 258b axially spaced apart from each in the vicinity of the side plates 213a and 213b and securely mounted on the lower plate 214b of the housing 210. The feed unit 250 further comprises a supporting plate 251 positioned between the bracket members 258a and 258b and pivotably supported by the bracket members 258a and 258b through pivotal pins 251a and 251b, and a rotation shaft 256 having a center axis, and supported by the supporting plate 251 with the center axis being in parallel relationship with the inner surface 241 of the guide plate 240 and with the inner surface 241 of the guide plate 240 extending toward the turntable 222. The feed unit 250 further comprises a pair of resilient members respectively constituted by coil springs 259a and 259b disposed between the supporting plate 251 and the lower plate 214b of the housing 210 to resiliently urge the supporting plate 251 toward the guide plate 240 to enable each of the optical discs 280 and 290 to be held by the guide plate 240 and the rotation shaft 256 when each of the optical discs 280 and 290 is loaded through the loading slot 211. The feed unit 250 further comprises driving means 257 constituted by an electric motor 257a, reduction gears 257b, 257c, 257d and 257e as best shown in FIG. 4. The reduction gear 257e is securely connected to the axial end portion 252a of the center shaft portion 252 of the rotation shaft 256 so that the rotation shaft 256 is driven to rotate by the electric motor 257a through the reduction gears 257b, 257c, and 257d.

The supporting plate 251 is pivotable to assume three different positions including a first position in which the rotation shaft 256 is resiliently urged by the coil springs 259a and 259b into contact with the guide plate 240, a second position in which each of the optical discs 280 and 290 is allowed to pass between the guide plate 240 and the rotation shaft 256 with the rotation shaft 256 being away from the guide plate 240 while the supporting plate 251 is being resiliently urged away from the guide plate 240 by each of the optical discs 280 and 290 away from the guide plate 240 against the coil springs 259a and 259b, and a third position in which the supporting plate 251 is resiliently urged to move out of the second position against the coil springs 259a and 259b to keep each of the optical discs 280 and 290 out of contact with the rotation shaft 256 to ensure each of the optical discs 280 and 290 is rotated on the turntable 222. The pivotal motions of the supporting plate 251 between the second and third positions are performed by the previously mentioned electric motor 257a through reduction gears not shown in the drawings.

The rotation shaft 256 has three different longitudinal portions 253, 254 and 255 including first and second side portions 253 and 254 axially spaced apart from each other, and a spacer portion 255 intervening between the first and second side portions 253 and 254. The first and second side portions 253 and 254 is tapered toward the spacer portion 255. This means that each of the first and second side portions 253 and 254 is in the form of a truncated cone shape longitudinally gradually reduced in diameter from each of the axially outer ends 253a and 254a thereof to each of the axially inner ends 253b and 254b thereof as will be seen from FIGS. 2, and 4 to 13.

The rotation shaft 256 includes a center shaft portion 252 having both axial end portions 252a and 252b extending axially outwardly from the first and second side portions 253 and 254 to be rotatably supported by the supporting plate 251. The first and second side portions 253 and 254 and the spacer portion 255 are fixedly mounted on the center shaft portion 252 with the first and second side portions 253 and 254 being integrally formed with the spacer portion 255. The spacer portion 255 may be rotatably mounted on the center shaft portion 252 of the rotation shaft 256 to be rotated relatively with respect to the first and second side portions 253 and 254 according to the present invention. This means that the first and second side portions 253 and 254 may be rotated together with the center shaft portion 252 while the spacer portion 255 being rotated relatively with respect to the center shaft portion 252.

The spacer portion 255 has a cross-section taken on a plane perpendicular to the center axis of the rotation shaft 256, and the first and second side portions 253 and 254 each has a cross-section taken on a plane perpendicular to the center axis of the rotation shaft 256, the cross-section of the spacer portion 255 being smaller in diameter than the cross-section of each of the first and second side portions 253 and 254. The first and second side portions 253 and 254 have respective shapes identical to each other. Each of the first and second side portions 253 and 254 is made of a rubber material such as a silicon rubber.

The spacer portion 255 has a pair of side sections 255a and 255b axially spaced apart from each other, and a central section 255c intervening the side sections 255a and 255b, the side sections 255a and 255b of the spacer portion 255 each being tapered toward the central section 255c. The central section 255c is integrally formed with the side sections 255a and 255b. The side sections 255a and 255b of the spacer portion 255 have respective shapes identical to each other. The central section 255c of spacer portion 255 has a cross-section taken on a plane perpendicular to the center axis of the rotation shaft 256, and the side sections 255a and 255b each has a cross-section taken on a plane perpendicular to the center axis of the rotation shaft 256, the cross-section of the central section 255c being smaller in diameter than the cross-section of each of the side sections 255a and 255b. The central section 255c of spacer portion 255 is in the form of cylindrical shape longitudinally identical in diameter. The spacer portion 255 is made of a lubricative synthetic resin such as for example polyacetal (POM), polyamide (PA) and polytetrafluoroethylene (PTFE). The spacer portion 255 is more lubricative than the first and second side portions 253 and 254 to ensure that each of the optical discs 280 and 290 is more smoothly contacted with the spacer portion 255 than the first and second side portions 253 and 254 to have each of the optical discs 280 and 290 conveyed toward the turntable 222 by the first and second side portions 253 and 254 having a loading force larger than that of the spacer portion 255.

The driving means 257 is adapted to drive the rotation shaft 256 to have the rotation shaft 256 rotated around the center axis to ensure that each of the optical discs 280 and 290 is conveyed toward the turntable 222 by the rotation shaft 256 while each of the optical discs 280 and 290 is being guided by the guide plate 240. The driving means 257 is constituted by an electric motor 257a fixedly mounted on the lower plate 214b of the housing 210.

From the foregoing description about the fact that the feed unit 250 comprises a pair of bracket members 258a and 258b, a supporting plate 251, and a rotation shaft 256 as described in details, it will be understood that the rotation shaft 256 is supported by the housing 210 through the bracket members 258a and 258b, and the supporting plate 251 with the center axis being in parallel relationship with the inner surface 241 of the guide plate 240 as set forth in claims.

In this embodiment of the optical disc driving apparatus, the first and second side portions 253 and 254 are each of 40 mm in axial length and have respective contact lengths 253CL and 254CL (see FIG. 9) of 10 mm in which the optical disc of 8-centimeter diameter is held in contact with the first and second side portions 253 and 254 when the optical disc of 8-centimeter diameter is retained by the turntable 222. The spacer portion 255 is of 40 mm in axial length and mounted on the center shaft portion 252 between the first and second side portions 253 and 254.

The previously mentioned embodiment of the optical disc driving apparatus which is constructed to comprise the first and second side portions 253 and 254 of 40 mm, and the spacer portion 255 of 40 mm is found by the present inventors to have brought about the most preferable results in terms of the certainty and speed of the retaining operation of each of the optical discs 280 and 290 to the turntable 222.

The operation of the optical disc driving apparatus will hereinafter be described with reference to FIGS. 6 to 13.

Figure 6:
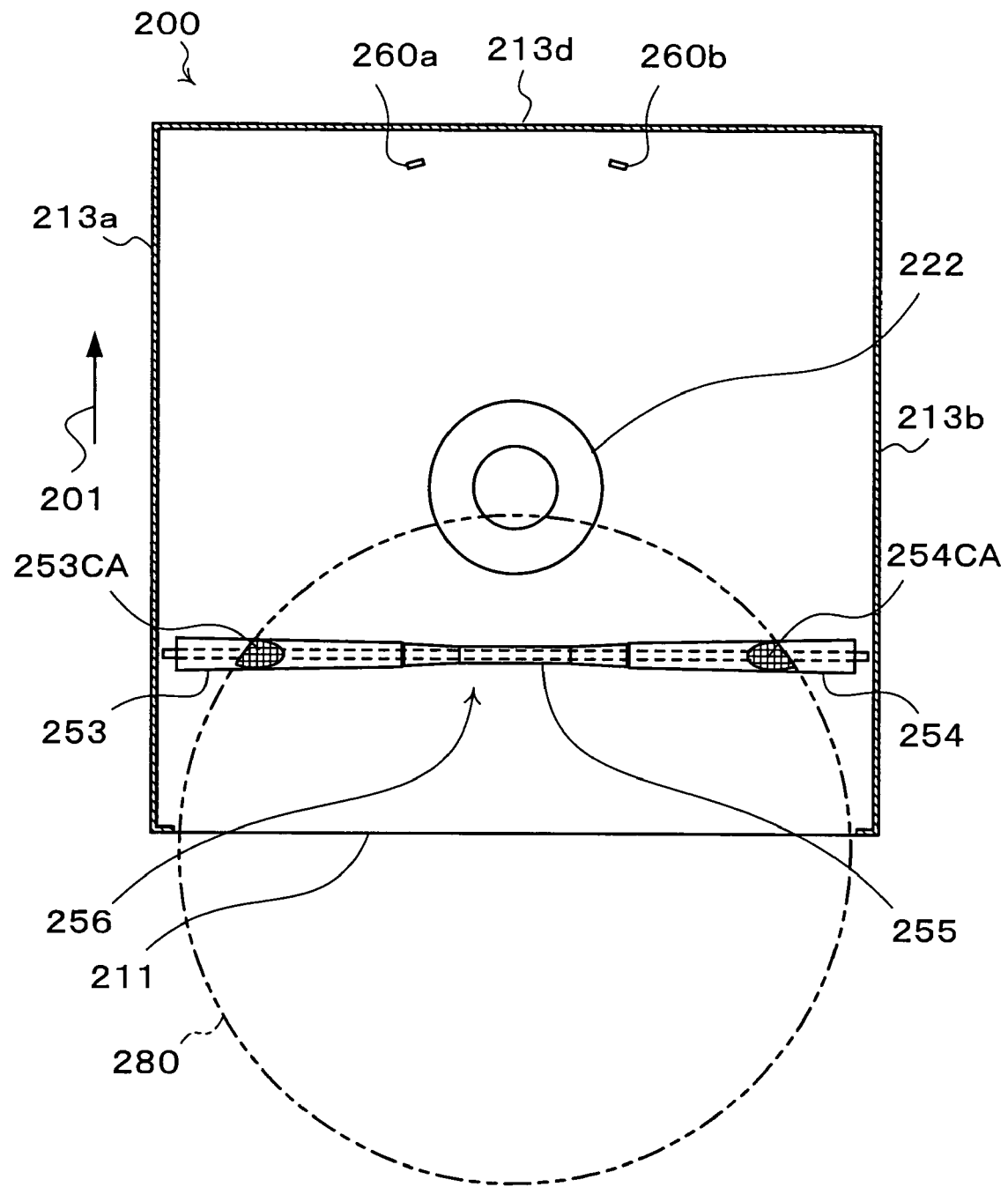
FIG. 6 is a plan view of the optical disc driving apparatus according to the present invention and showing a state that an optical disc of 12-centimeter diameter is loaded through the loading slot formed in the front plate forming part of the housing.
Figure 7:
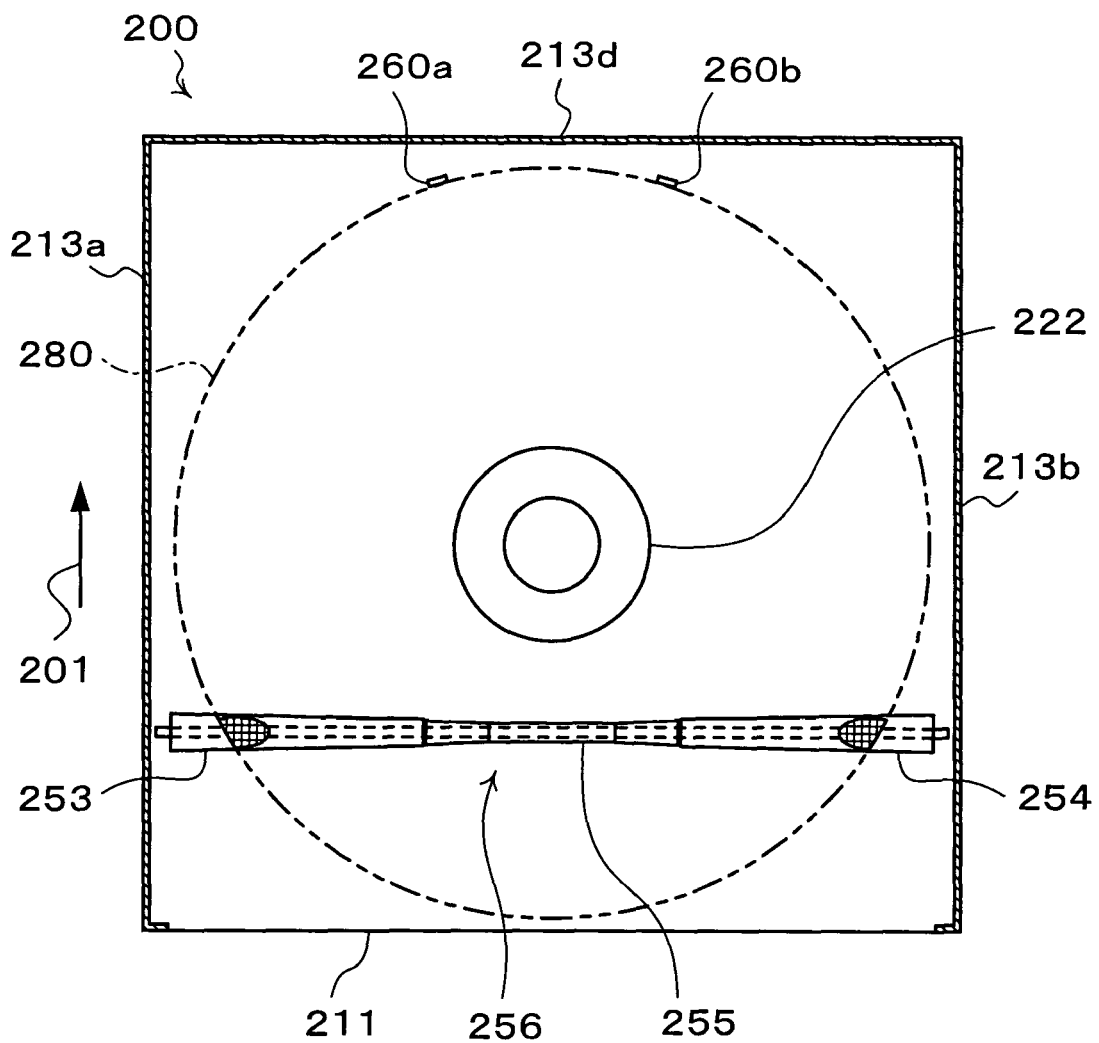
FIG. 7 is a plan view similar to FIG. 6 but showing a state that the optical disc of 12-centimeter diameter is retained by the turntable in axial alignment with the turntable.

In FIG. 6, there are shown a pair of meshed portions drawn on the first and second side portions 253 and 254 to show respective contact areas between the optical disc 280 of 12-centimeter diameter and the first and second side portions 253 and 254. The other meshed portions appearing in FIGS. 7 to 9 and 10 to 13 also show the contact area between the optical disc 280 of 12-centimeter diameter or the optical disc 290 of 8-centimeter diameter and the first side portion 253 and/or the second side portion 254.

Firstly, the loading operation of the optical disc 280 of 12-centimeter diameter will be described hereinafter.

The optical disc 280 is inserted through a central portion 211c (see FIG. 3) of the loading slot 211 by an operator as seen in FIG. 6. The left and right lower peripheral surfaces of the optical disc 280 are brought into contact with the first and second side portions 253 and 254 of the rotation shaft 256. Under these conditions, the optical disc 280 is subject to a driving force in the direction shown by an arrow 201 which is caused by the rotation of the rotation shaft 256 under the influence of the friction force generated in the contact areas, shown by blocks of crossed lines at 253CA and 254CA, between the optical disc 280 and the first and second side portion 253 and 254 of the rotation shaft 256 in FIG. 6, so that the optical disc 280 is conveyed toward the turntable 222 while being retained by the guide plate 240 and the first and second side portions 253 and 254 of the rotation shaft 256. The optical disc 280 continues to be conveyed toward the turntable 222 until the outer peripheral surface of the optical disc 280 is brought into engagement with the second positioning pins 260a and 260b in FIG. 7. This results in the fact that the optical disc 280 is stopped on the turntable 222 with the rotation shaft 256 being also stopped by the electric motor 257a.

Secondly, the loading operation of the optical disc 280 of 8-centimeter diameter will be described hereinafter.

Figure 8:
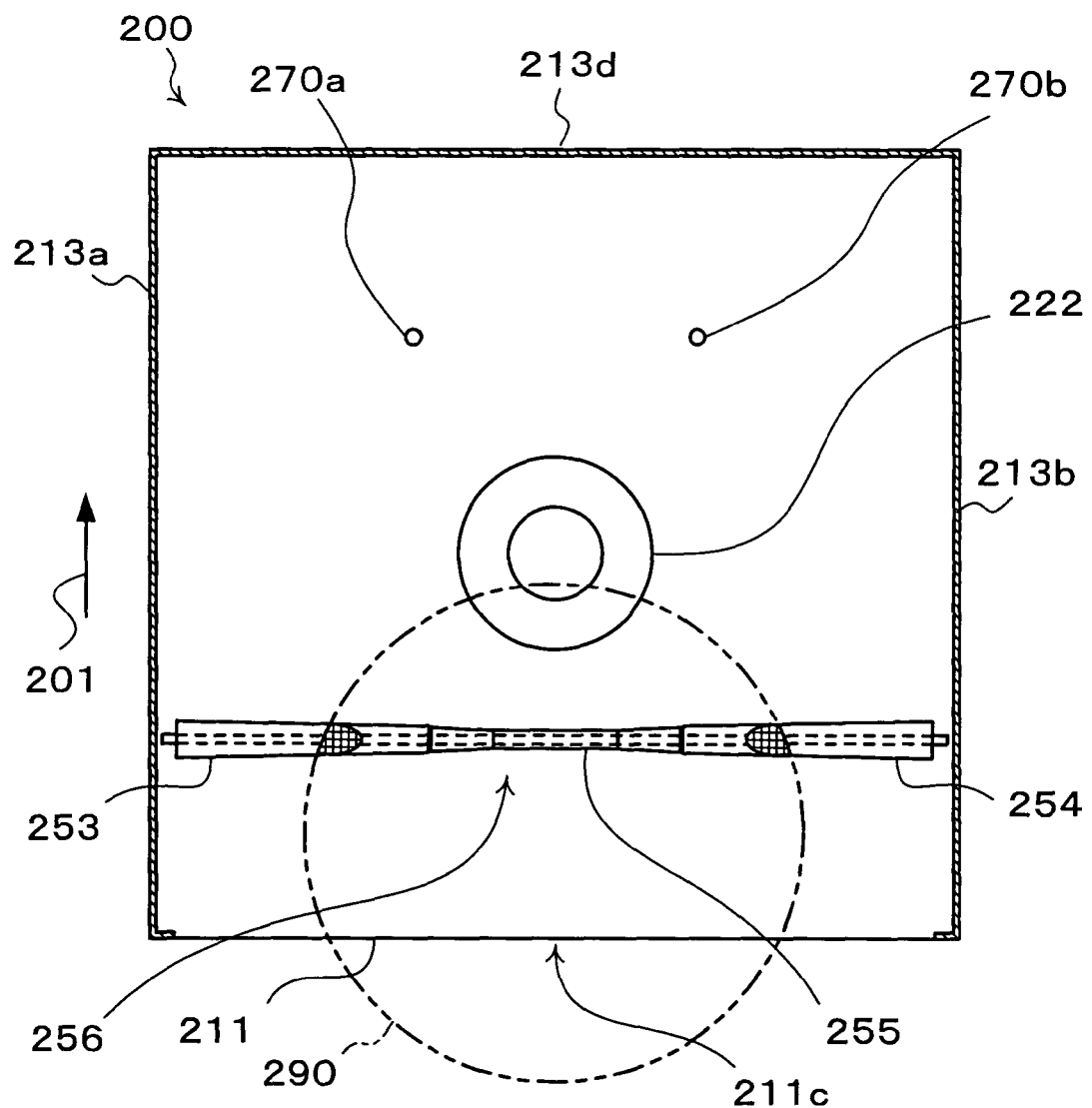
FIG. 8 is a plan view similar to FIG. 6 but showing a state that an optical disc of 8-centimeter diameter is loaded through the loading slot to be conveyed to the turntable in friction contact with the rotation shaft.
Figure 9:
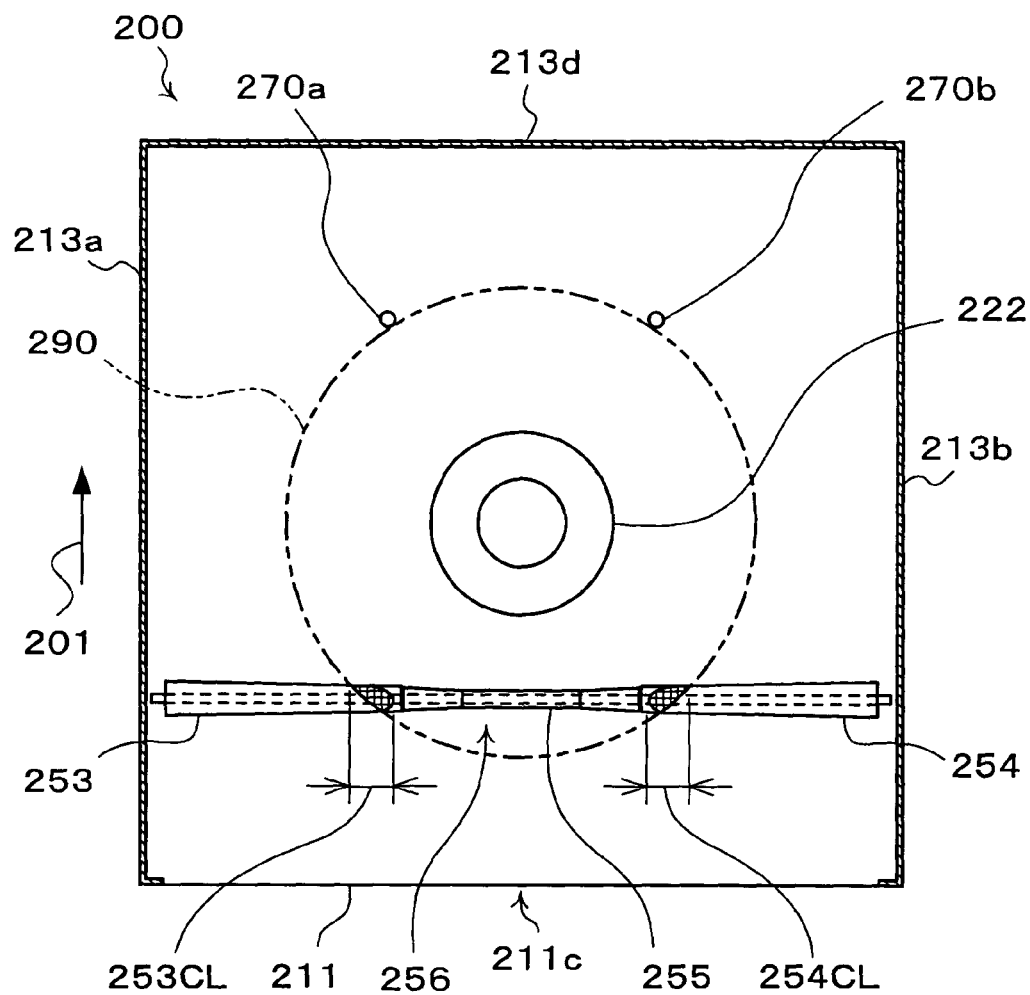
FIG. 9 is a plan view similar to FIG. 6 but showing a state that the optical disc of 8-centimeter diameter is retained by the turntable in axial alignment with the turntable.

It is, here, assumed that the optical disc 290 is inserted through the central portion 211c of the lording slot 211 by an operator as seen FIG. 8. The left and right lower peripheral surfaces of the optical disc 290 are brought into contact with the first and second side portions 253 and 254 of the rotation shaft 256. Under these conditions, the optical disc 290 is subject to a driving force in the direction shown by the arrow 201 which is caused by the rotation of the rotation shaft 256 under the influence of the friction force generated in the contact areas, shown by blocks of crossed lines at 253CA and 254CA, between the optical disc 290 and the first and second side portion 253 and 254 of the rotation shaft 256 in FIG. 8, so that the optical disc 290 is lorded toward the turntable 222 by retaining between the guide plate 240 and the first and second side portions 253 and 254 of the rotation shaft 256. The optical disc 290 is conveyed toward the turntable 222 until the outer peripheral surface of the optical disc 290 is brought into engagement with the first positioning pins 270a and 270b in FIG. 9. This results in the fact that the optical disc 290 is stopped on the turntable 222 with the rotation shaft 256 being also stopped by the electric motor 257a.

Figure 10:
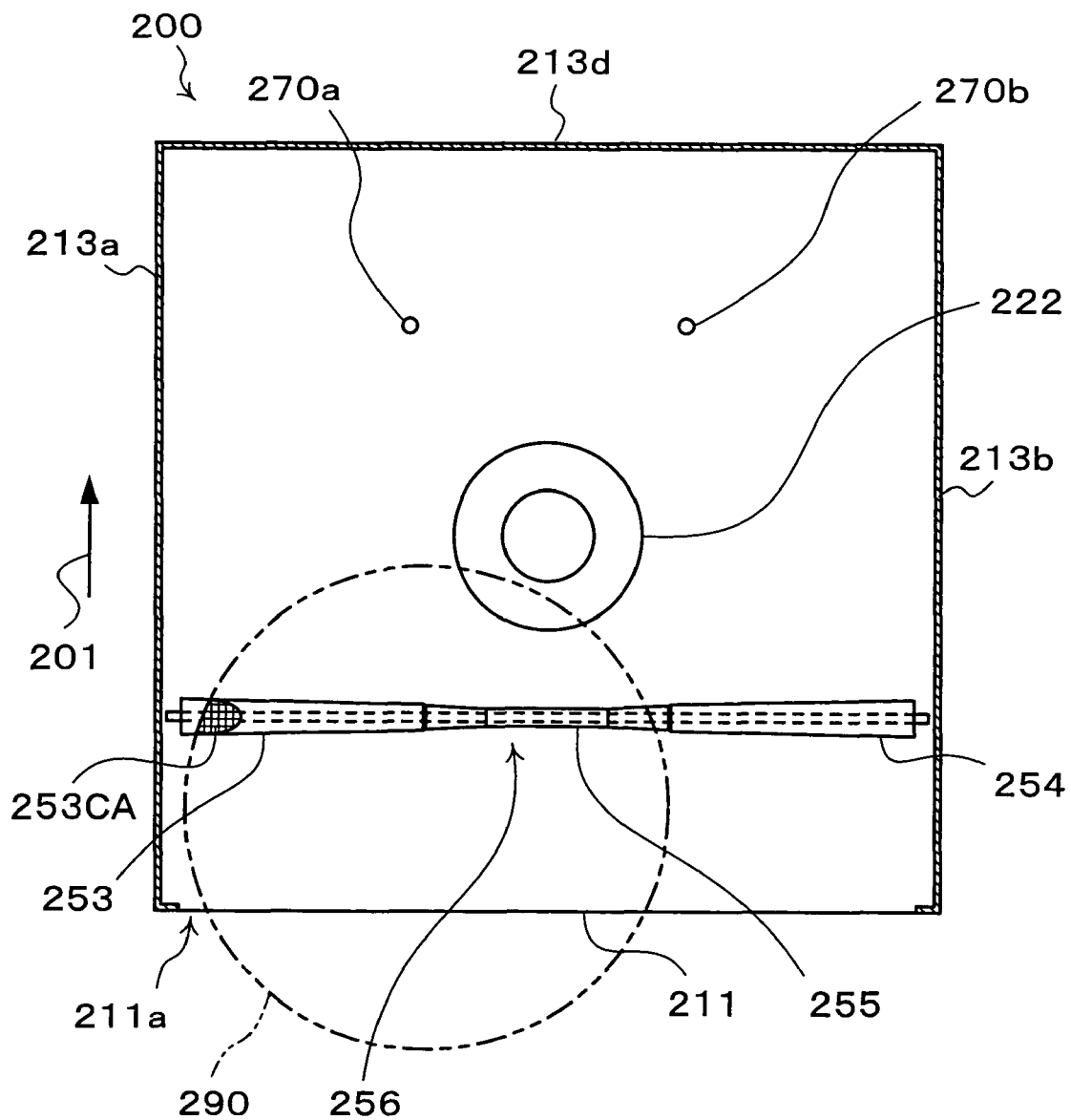
FIG. 10 is a plan view similar to FIG. 6 but showing a state that the optical disc of 8-centimeter is inserted through the left end portion of the loading slot by an operator.
Figure 11:
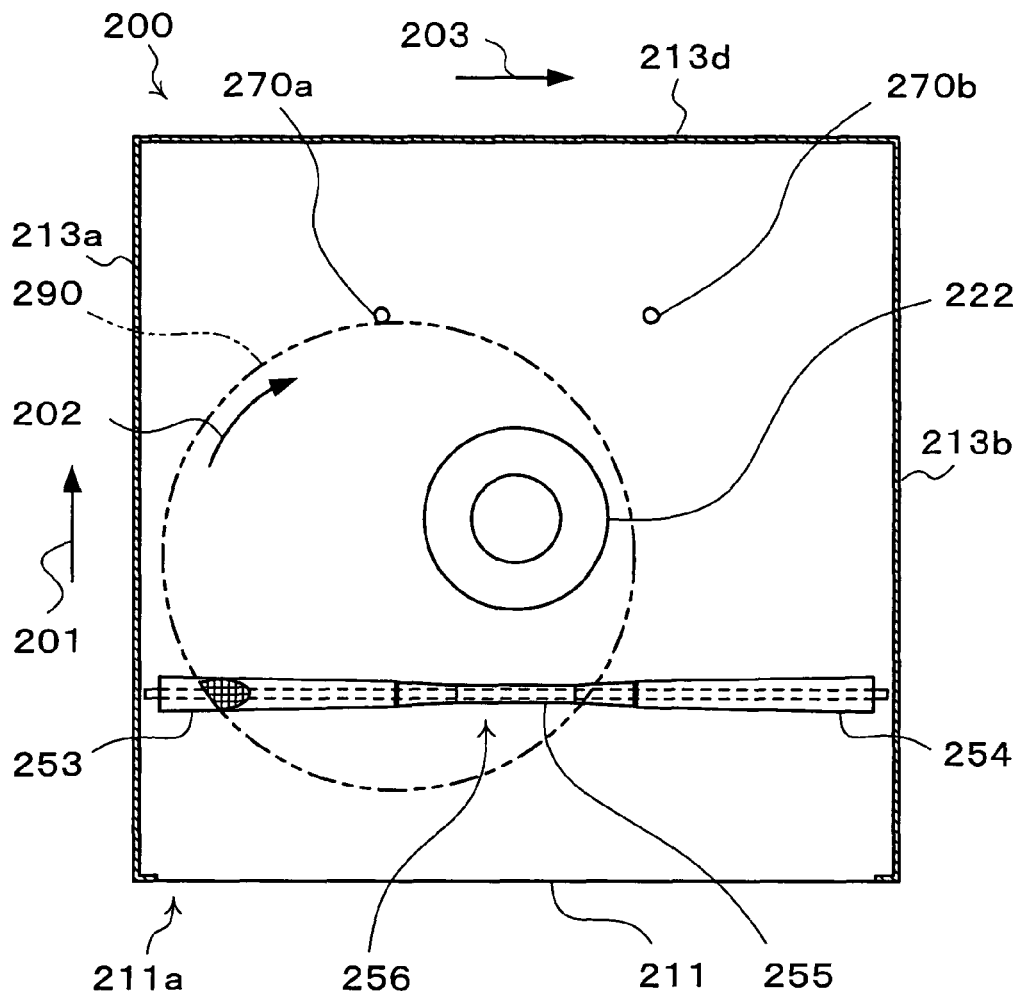
FIG. 11 is a plan view similar to FIG. 6 but showing a state that the outer peripheral surface of the optical disc of 8-centimeter is brought into engagement with the left positioning pin.
Figure 12:
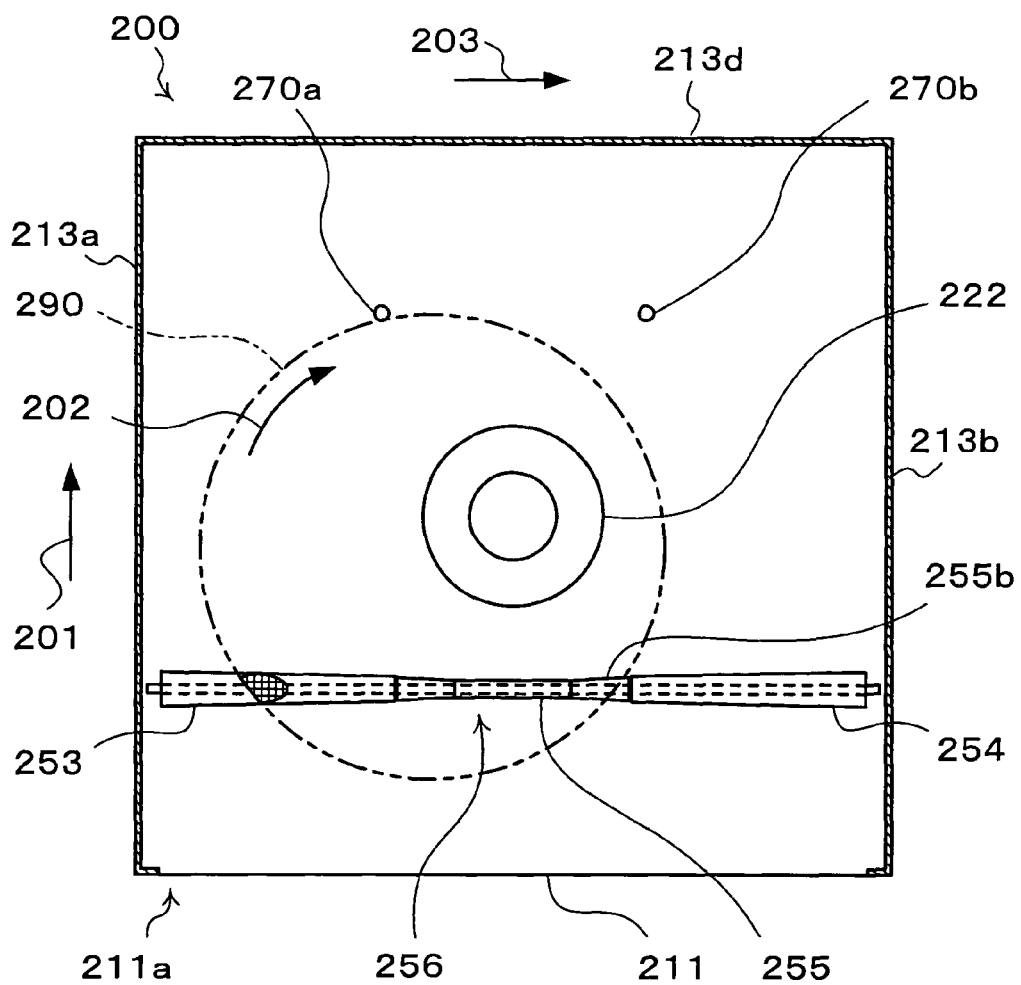
FIG. 12 is a plan view similar to FIG. 6 but showing a state that the optical disc is slightly moved to a position rightwardly from the potion shown in FIG. 11.
Figure 13:
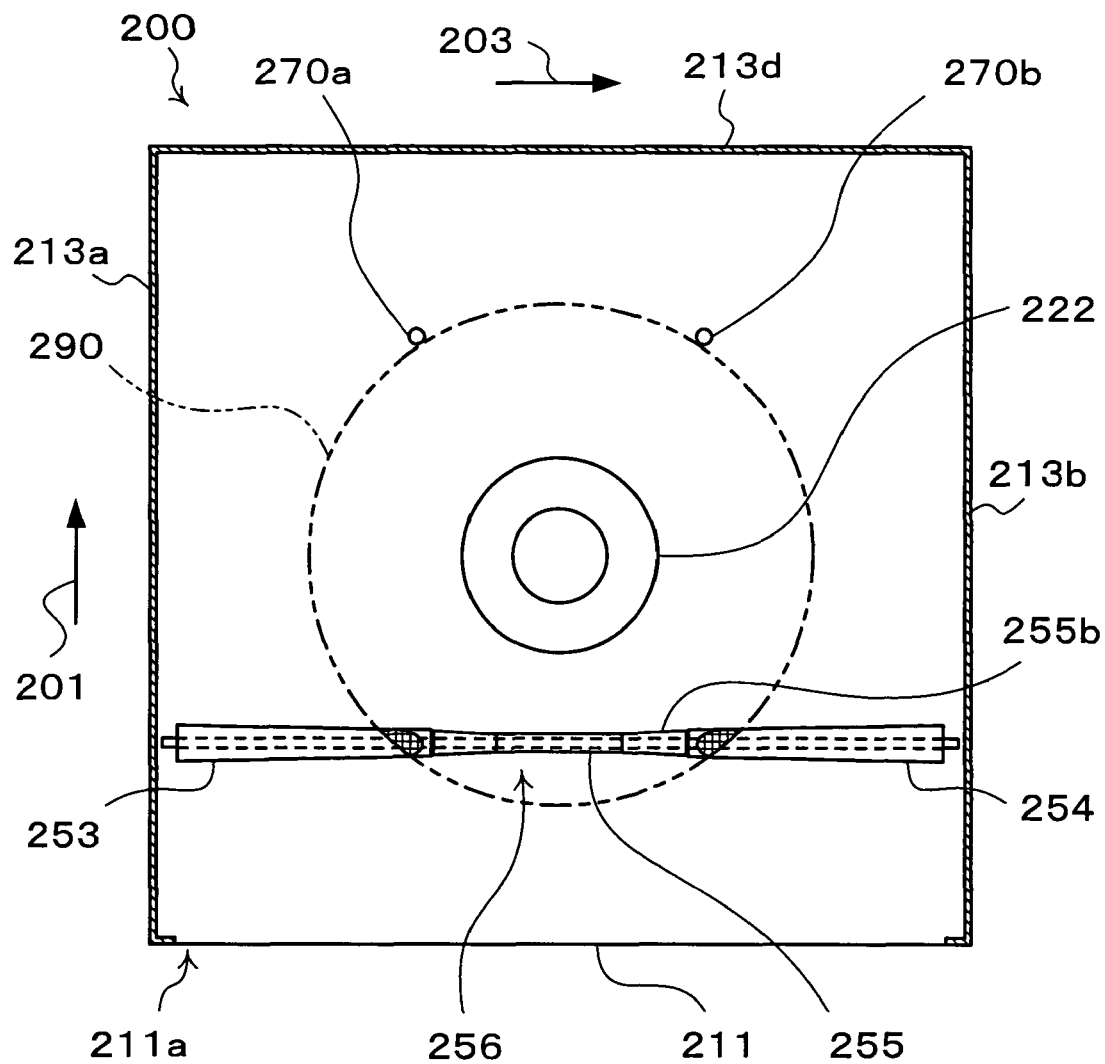
FIG. 13 is a plan view similar to FIG. 6 but showing a state that the optical disc of 8-centimeter diameter is retained by the turntable in axial alignment with the turntable.

It is, here, assumed that the optical disc 290 is inserted through the left end portion 211a of the loading slot 211 by an operator as seen in FIG. 10. At this time, the left peripheral surface of the optical disc 290 is positioned in neighborhood of the left end portion 211a of the loading slot 211, while the left lower peripheral surface of the optical disc 290 is brought into contact with the first side portion 253 of the rotation shaft 256. Under these conditions, the optical disc 290 is subject to a driving force compounded by the first directional force in the direction 201 and the second directional force in the direction shown by an arrow 203 both of which are caused by the rotation of the rotation shaft 256 under the influence of the friction force generated in a contact area, shown by a block of crossed lines at 253CA, between the optical disc 290 and the first side portion 253 of the rotation shaft 256 in FIG. 10. This results in the fact that the optical disc 290 is rotated in a rotation direction shown by an arrow 202 (see FIG. 11) and conveyed in the direction 203 by the first and second directional forces respectively in the directions 201 and 203. The first directional force of the driving force in the direction 201 is caused by the rotation of the rotation shaft 256, while the second directional force of the driving force in the direction 203 is caused by the tapered first side portion 253 of the rotation shaft 256. The optical disc 290 is conveyed toward the turntable 222 until the outer peripheral surface of the optical disc 290 is brought into engagement with the left positioning pin 270a in FIG. 11. When the outer peripheral surface of the optical disc 290 is brought into engagement with the left positioning pin 270a, the right lower peripheral surface of the optical disc 290 is not brought into contact with the second side portion 254 of the rotation shaft 256 in FIG. 12. At this time, the optical disc 290 is subject to a driving force compounded by first and second directional forces in the directions 201 and 203 caused only by the rotated first side portion 253 but not caused by the rotated second side portion 254. This means that the second directional force in the direction 203 caused by the rotated first side portion 253 is not reduced by the second directional force in the direction opposite to the direction 203 caused by the rotated second side portion 254. The rotation force of the optical disc in the rotation direction 202 is not reduced because of the first directional force in the direction 201 not caused by the rotated second side portion 254. This results in the fact that the optical disc can be loaded on and retained by the turntable with certainty and with a relatively shorter time of period than the conventional optical disc driving apparatus.

Although the above description has been made with assumption that the optical disc 290 of 8-centimeter is inserted through the left end portion 211a of the loading slot 211 in FIG. 10, the optical disc 290 of 8-centimeter may be inserted through the right end portion 211b (see FIG. 3) of the loading slot 211 to ensure the same function and effect as the case of inserting the optical disc 290 into the left end portion 211a of the loading slot 211.

From the foregoing description, it will be understood that the optical disc is loaded on and retained by the turntable with certainty and with a relatively shorter time of period than the conventional optical disc driving apparatus.

Although there has been described in the above about the first preferred embodiment of the optical disc driving apparatus according to the present invention, this embodiment may be replaced by the second preferred embodiment of the optical disc driving apparatus according to the present invention in order to attain the objects of the present invention. The following description will hereinafter be directed to the second preferred embodiment of the optical disc driving apparatus according to the present invention.

Figure 14:
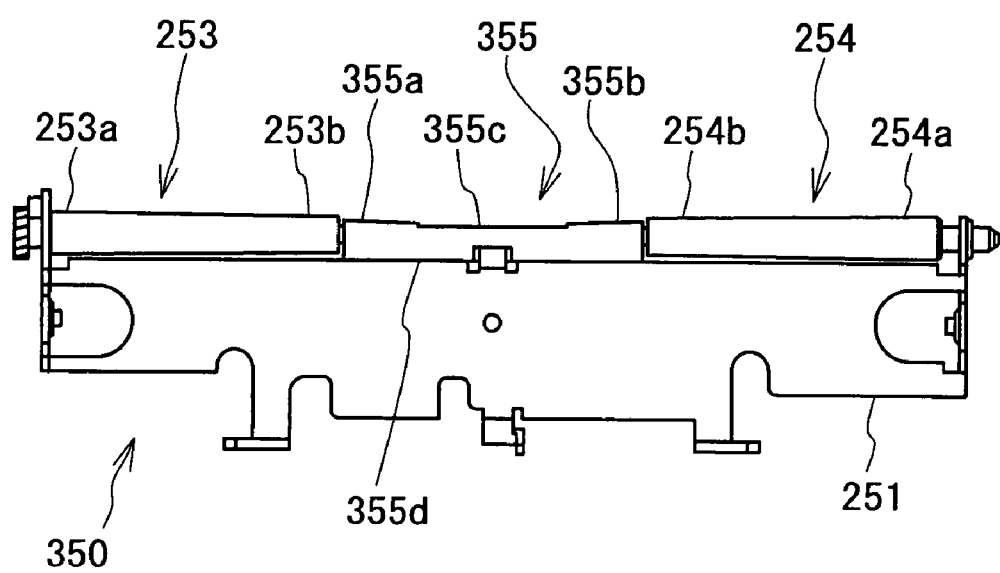
FIG. 14 is a front view of the second preferred embodiment of the optical disc driving apparatus according to the present invention and showing a rotation shaft, and a bracket member for rotatably supporting the rotation shaft.
Figure 15:
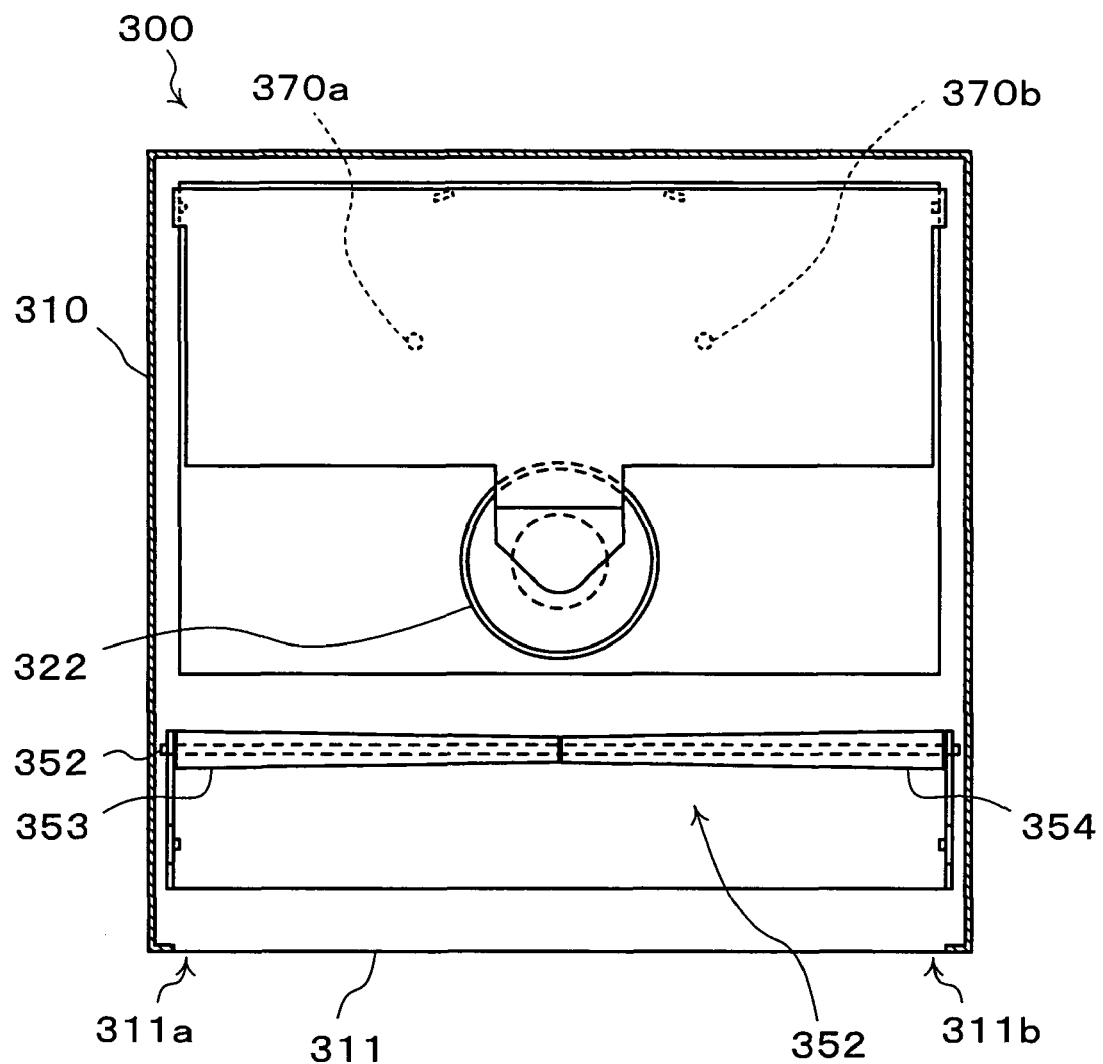
FIG. 15 is a plan view of a conventional disc driving apparatus with a guide plate and an upper plate omitted but showing a rotation shaft, positioning pins, and a turntable provided in a housing forming of the conventional disc driving apparatus.
Figure 16:
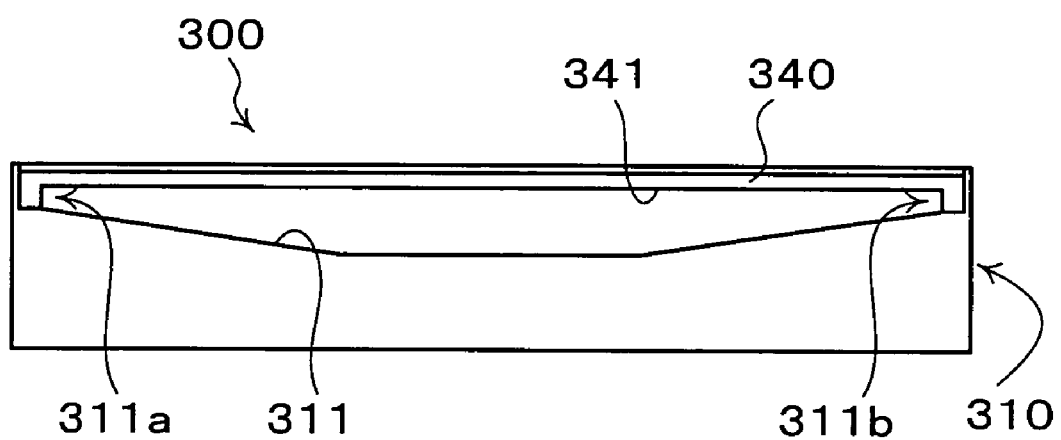
FIG. 16 is a front view of the conventional disc driving apparatus and showing a front plate formed with a loading slot.
Figure 17:
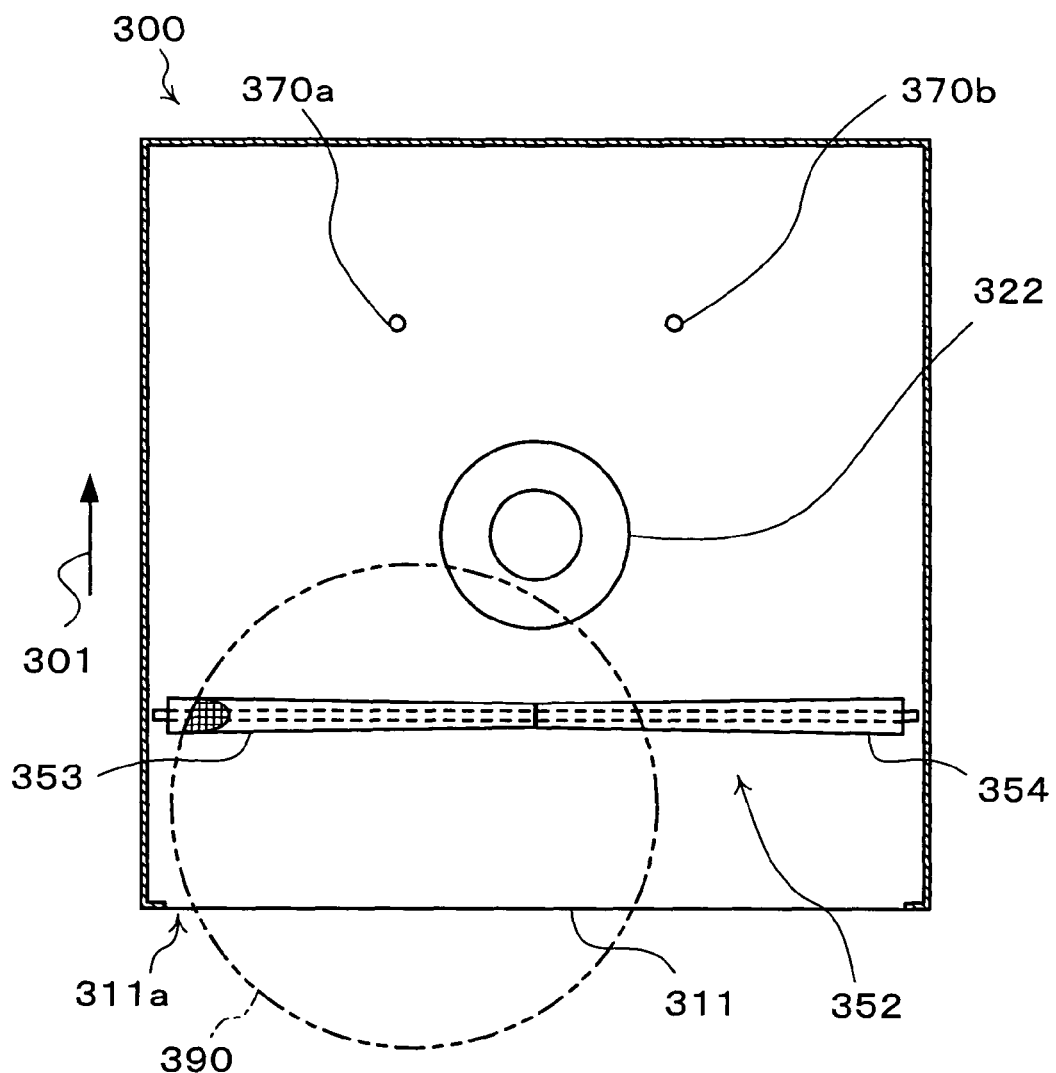
FIG. 17 is a plan view of similar to FIG. 15 but showing a state that an optical disc of 8-centimeter is inserted through the left end portion of the loading slot by an operator.
Figure 18:
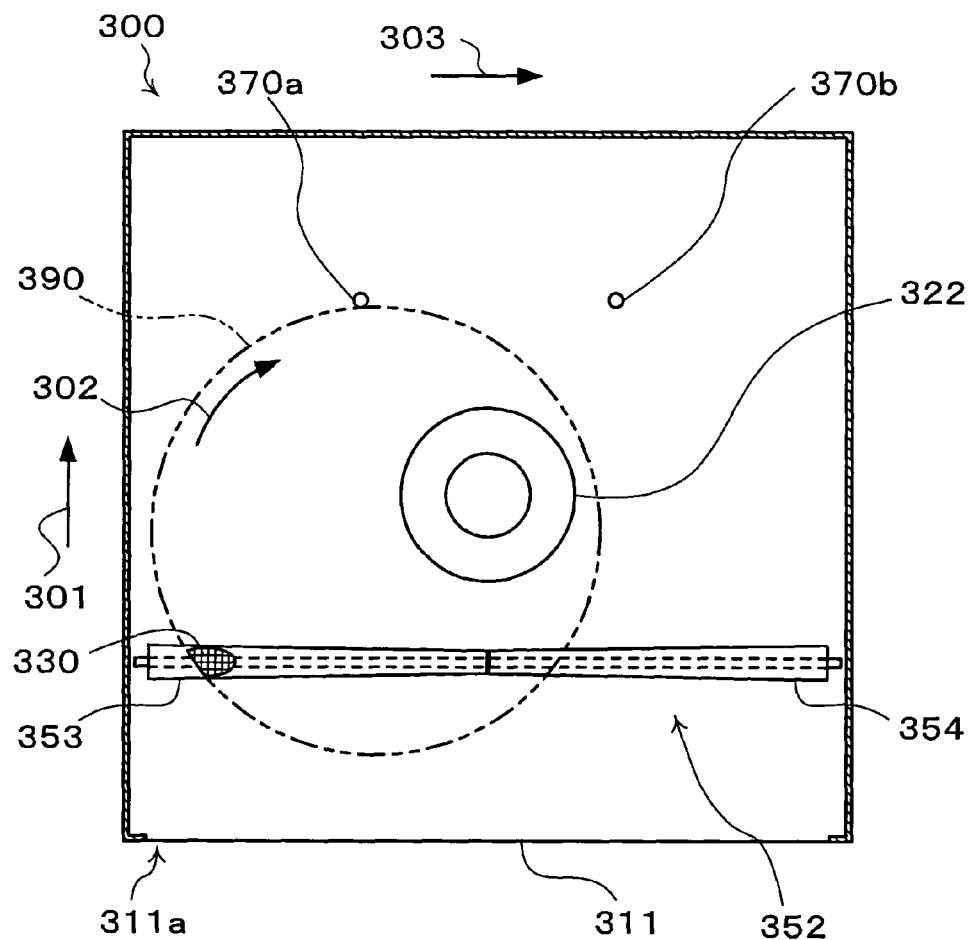
FIG. 18 is a plan view of similar to FIG. 15 but showing a state that the outer peripheral surface of the optical disc of 8-centimeter is brought into engagement with the left positioning pin.
Figure 19:
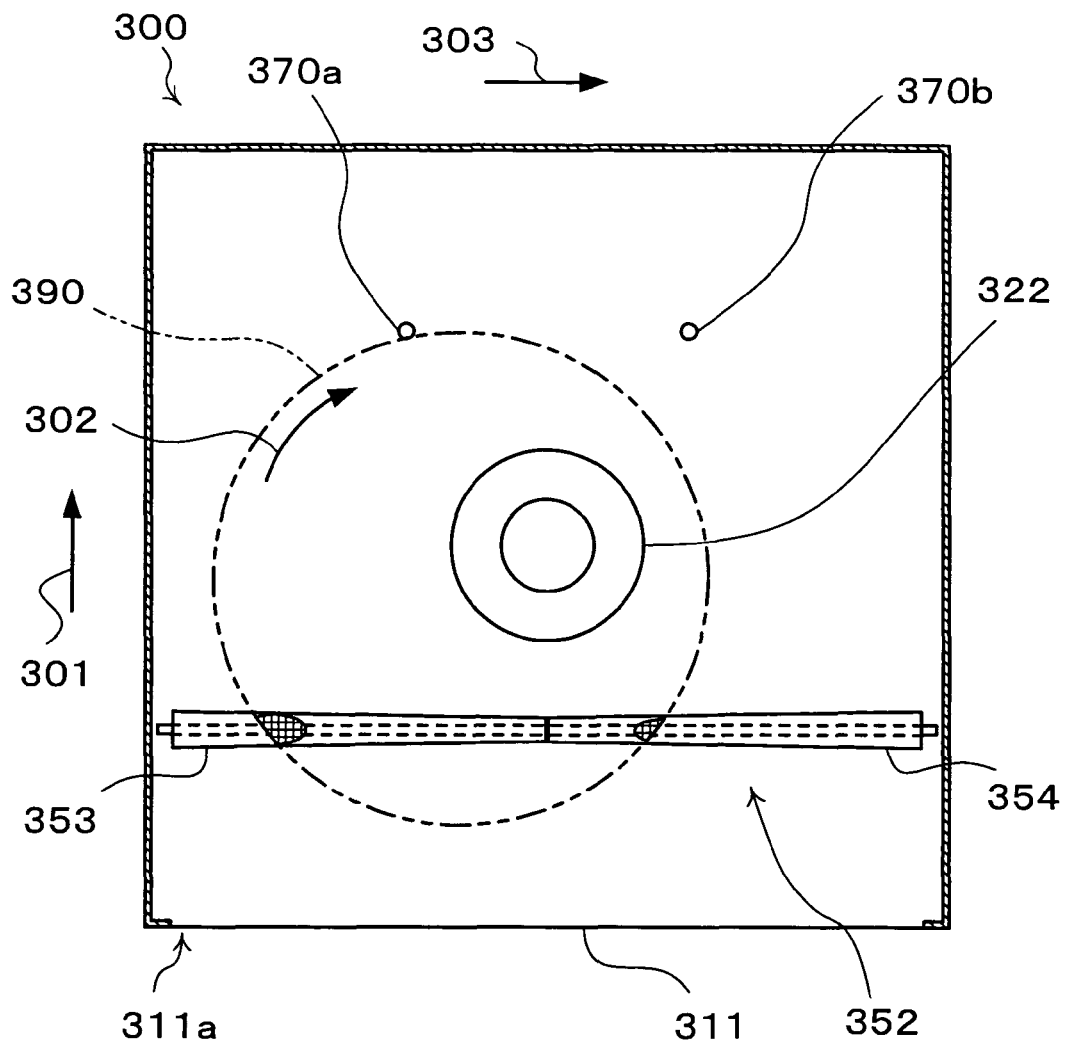
FIG. 19 is a plan view of similar to FIG. 15 but showing a state that the optical disc is slightly moved to a position rightwardly from the potion shown in FIG. 18.
Figure 20:
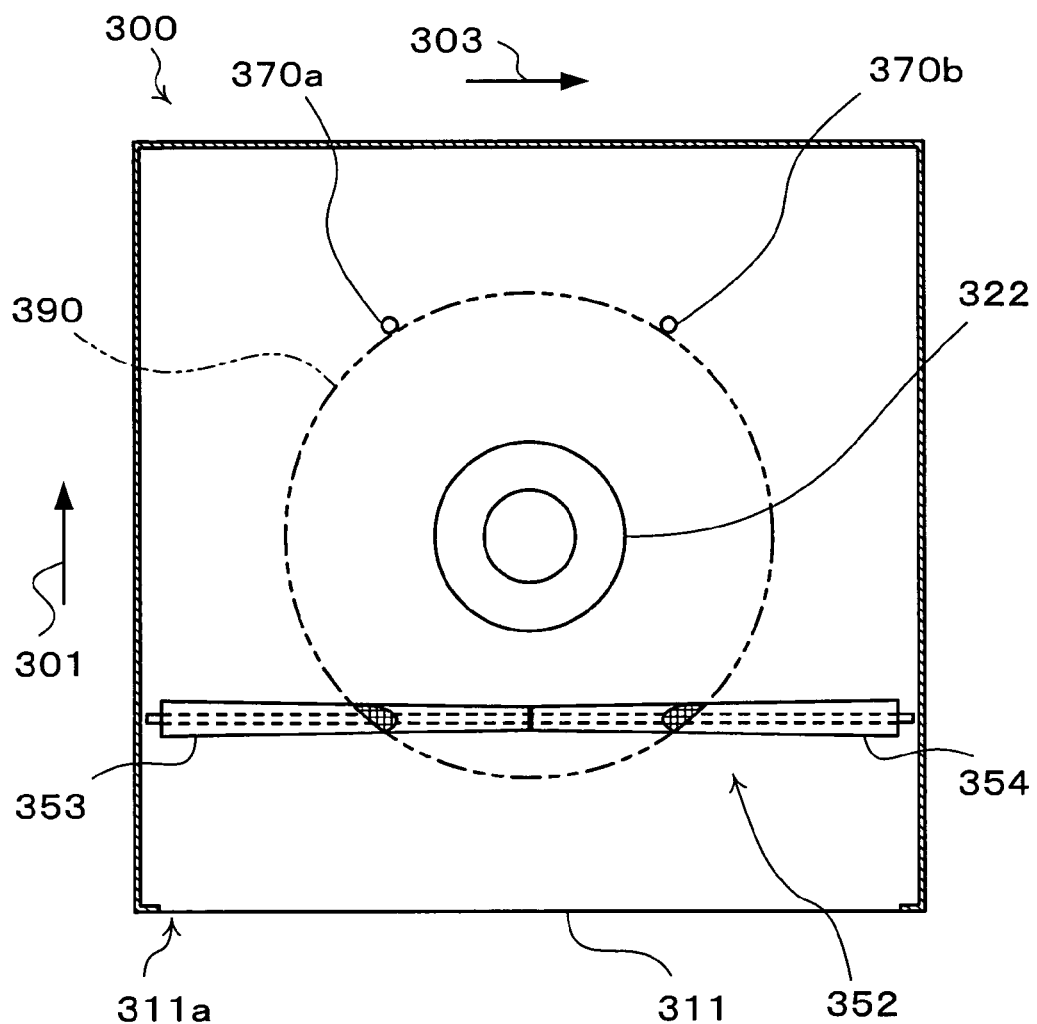
FIG. 20 is a plan view of similar to FIG. 15 but showing a state that the optical disc of 8-centimeter diameter is retained by the turntable in axial alignment with the turntable.

Referring then to FIG. 14 of the drawings, there is shown a front view partly showing a feeding unit forming part of the second preferred embodiment of the optical disc driving apparatus according to the present invention. The constitutional elements and parts of the second preferred embodiment of the optical disc driving apparatus according to the present invention as shown in FIG. 14 are entirely the same as those of the first preferred embodiment of the optical disc driving apparatus according to the present invention as shown in FIGS. 1 to 13 except for the constitutional elements and parts appearing in the following description. Therefore, only the constitutional elements and the steps of the second embodiment of the optical disc driving apparatus different from those of the first embodiment of the optical disc driving apparatus will be described in detail hereinafter. The constitutional elements and parts of the second preferred embodiment of the optical disc driving apparatus entirely the same as those of the first preferred embodiment of the optical disc driving apparatus will not be described but bear the same reference numerals as those of the first preferred embodiment of the optical disc driving apparatus in FIGS. 1 to 13 to avoid tedious repetition.

The following description will be directed to the constitutional elements and parts of the second preferred embodiment of the optical disc driving apparatus different from those of the first preferred embodiment of the optical disc driving apparatus.

The spacer portion 355 of the rotation shaft 256 is rotatably mounted on the center shaft portion 252 so that the spacer portion 355 is rotatable relatively to the center shaft portion 252 and the first and second portions 253 and 254. The lower end 355d of the spacer portion 355 of the rotation shaft 256 is securely connected to the supporting plate 251.

The spacer portion 355 has a pair of side sections 355a and 355b axially spaced apart from each other, and a central section 355c intervening the side sections 355a and 355b, the side sections 355a and 355b of the spacer portion 355 each being tapered toward the central section 355c. The central section 355c is integrally formed with the side sections 355a and 355b. The side sections 355a and 355b of the spacer portion 355 have respective shapes identical to each other. The central section 355c of spacer portion 355 has a cross-section taken on a plane perpendicular to the center axis of the rotation shaft 256, and the side sections 355a and 355b each has a cross-section taken on a plane perpendicular to the center axis of the rotation shaft 256, the cross-section of the central section 355c being smaller in diameter than the cross-section of each of the side sections 355a and 355b. The central section 355c of spacer portion 355 is in the form of cylindrical shape longitudinally identical in diameter. The spacer portion 355 is made of a lubricative synthetic resin such as for example polyacetal (POM), polyamide (PA) and polytetrafluoroethylene (PTFE). The spacer portion 355 is more lubricative than the first and second side portions 253 and 254 to ensure that the optical disc 290 is more smoothly contacted with the spacer portion 355 than the first and second side portions 253 and 254 to have the optical disc 290 conveyed toward the turntable 222 by the first and second side portions 253 and 254 having a loading force larger than that of the spacer portion 355.

In the second preferred embodiment, each of the optical discs 280 and 290 is not subject to the first directional force in the direction 201 and the third directional force in the direction opposing to the second direction 203 so that the optical disc 290 of 8-centimeter diameter can be easily adjusted, thereby making it possible to bring about the most preferable results in terms of the certainty and speed of the retaining operation of the optical disc 290 to the turntable 222 even if the optical disc 290 is loaded through any one of the right and left side end portions 211a and 211b of the loading slot 211 by the operator.

What is claimed is:

1. An optical disc driving apparatus for selectively driving two kinds of optical discs different in diameter from each other to reproduce information recorded in said optical disc while reading out information in said optical disc, comprising:
   a housing formed with a loading slot having said optical disc pass therethrough;
   a turntable for retaining said optical disc, said turntable being supported by said housing and having a center axis, said turntable being driven to rotate around said center axis with said optical disc being retained by said turntable to reproduce information recorded in said optical disc while reading out information in said optical disc;
   a guide plate positioned within said housing in the vicinity of said loading slot and supported by said housing, said guide plate having an inner surface contactable with said optical disc to guide said optical disc toward said turntable until said optical disc is retained by said turntable after being partly passed through said loading slot;
   a rotation shaft having a center axis and supported by said housing with said center axis being in parallel relationship with said inner surface of said guide plate said guide plate extending toward said turntable, said rotation shaft having three different longitudinal portions including first and second side portions axially spaced apart from each other, and a spacer portion intervening between said first and second side portions, said first and second side portions being tapered toward said spacer portion; and
   driving means for driving said rotation shaft to have said rotation shaft rotate around said center axis to ensure that said optical disc is conveyed toward said turntable by said rotation shaft while said optical disc is being guided by said guide plate and in which
   said spacer portion is made of a lubricative synthetic resin, said spacer portion being more lubricative than said first and second side portions to ensure that said optical disc is more smoothly contacted with said spacer portion than said first and second side portions to have said optical disc conveyed toward said turntable by said first and second side portions having a loading force larger than that of said spacer portion.

2. An optical disc driving apparatus as set forth in claim 1, in which said spacer portion has a cross-section arbitrarily taken on a plane perpendicular to said center axis of said rotation shaft, and said first and second side portions each has a cross-section arbitrarily taken on a plane perpendicular to said center axis of said rotation shaft, said cross-section of said spacer portion being equal in diameter to or smaller in diameter than said cross-section of each of said first and second side portions.

3. An optical disc driving apparatus as set forth in claim 2, in which said first and second side portions have respective shapes identical to each other.

4. An optical disc driving apparatus as set forth in claim 1, in which said spacer portion is integrally formed with said first and second side portions.

5. An optical disc driving apparatus as set forth in claim 1, in which said spacer portion has a pair of side sections axially spaced apart from each other, and a central section intervening said side sections, said side sections of said spacer portion each being tapered toward said central section.

6. An optical disc driving apparatus as set forth in claim 5, in which said central section is integrally formed with said side sections.

7. An optical disc driving apparatus as set forth in claim 5, in which said side sections of said spacer portion have respective shapes identical to each other.

8. An optical disc driving apparatus as set forth in claim 5, in which said central section of spacer portion has a cross-section arbitrarily taken on a plane perpendicular to said center axis of said rotation shaft, and said side sections each has a cross-section arbitrarily taken on a plane perpendicular to said center axis of said rotation shaft, said cross-section of said central section being equal in diameter to or smaller in diameter than said cross-section of each of said side sections.

9. An optical disc driving apparatus as set forth in claim 5, in which said central section of spacer portion is in the form of cylindrical shape longitudinally uniform in diameter.

10. An optical disc driving apparatus as set forth in claim 5, in which said central section of spacer portion has a cross-section arbitrarily taken on a plane perpendicular to said center axis of said rotation shaft, and said first and second side portions each has a cross-section arbitrarily taken on a plane perpendicular to said center axis of said rotation shaft, said cross-section of said spacer portion being equal in diameter to or smaller in diameter than said cross-section of each of said first and second side portions.

11. An optical disc driving apparatus as set forth in claim 1, which further comprises a plurality of positioning pins for positioning said optical discs at its operation position in which said center axis of said optical disc is axially aligned with said central axis of said turntable.

12. An optical disc driving apparatus as set forth in claim 11, in which said positioning pins are fixedly provided in said housing at their respective positions rear of said turntable and in spaced relationship with one another.

13. An electrical device comprising an optical disc driving apparatus as set forth in claim 1.

14. An optical disc driving apparatus as set forth in claim 1, which further comprises: a plurality of first positioning pins for positioning said optical disc of a first diameter at its operation position in which said center axis of said optical disc is axially aligned with said central axis of said turntable;
a plurality of second positioning pins for positioning said optical disc of a second diameter larger than said first diameter at its operation position in which said center axis of said optical disc is axially aligned with said central axis of said turntable; and
detection means for detecting said optical disc of said second diameter to retract said first positioning pins out of said operation position to ensure said optical disc of said second diameter to be moved to and retained by said turntable.

* * * * *